Sept. 14, 1948.                G. A. MUIR                2,449,083
             METHOD OF AND APPARATUS FOR SETTING
                SELF-SYNCHRONOUS MACHINES ON ZERO
                      Filed April 15, 1946

INVENTOR.
GEORGE ALFRED MUIR
BY
*M A Hayes*
ATTORNEY

Patented Sept. 14, 1948

2,449,083

UNITED STATES PATENT OFFICE 2,449,083

METHOD OF AND APPARATUS FOR SETTING SELF-SYNCHRONOUS MACHINES ON ZERO

George Alfred Muir, New York, N. Y.

Application April 15, 1946, Serial No. 662,162

7 Claims. (Cl. 177—337)

(Granted under the act of March 3, 1883, as amended April 30, 1928; 370 O. G. 757)

This invention relates to synchro motors, generators, and systems, and in particular to a method of and an apparatus for setting synchro motors, generators, and systems on electrical zero position.

As used herein, the term "synchro" refers generically to self-synchronous electrical machines including self-synchronous motors, generators, differential motors and generators, control transformers, or other systems, also commonly known under other names such as "selsyn," "autosyn," and "synchrotie," and the term "synchro" will be used in the specification and claims to denote apparatus as thus defined.

An object of this invention is to provide a method of setting a synchro on electrical zero position.

Another object is to provide an apparatus for setting a synchro on electrical zero position.

A further object is to provide a method of setting a synchro on electrical zero position comprising applying an alternating current excitation to the rotor of said synchro, determining positions of said rotor that give minimum induced voltage between one pair of the stator terminals of said synchro, and determining which of these positions is the electrical zero position.

Another object is to provide a novel arrangement for setting a self-synchronous electrical machine on electrical zero wherein an alternating voltage of magnitude insufficient to produce rotation of the rotor of the machine is applied to the rotor, and wherein indicating means are provided to indicate the position of the rotor for which minimum voltage is induced in a selected phase of the stator of the machine.

A feature of the invention resides in the provision of an apparatus for setting a self-synchronous electrical machine on zero wherein a zero-center meter and an electron discharge glow device are utilized to indicate a desired setting of the machine.

Further objects and advantages of this invention, as well as its construction, arrangement and operation, will be apparent from the following description and claims in connection with the accompanying drawing, in which:

Figure 1:
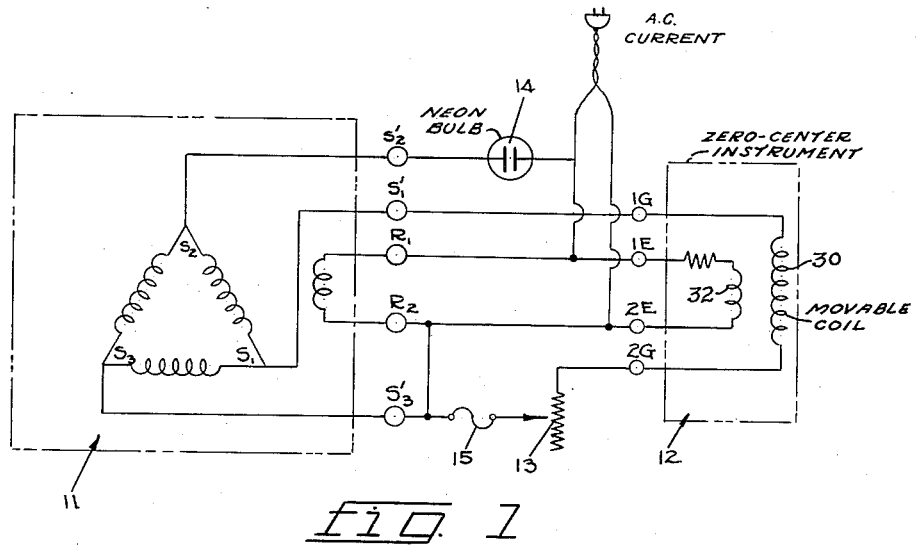
Fig. 1 is a wiring diagram for one form of this invention including the synchro being set on electrical zero.

There is shown in Fig. 1 a synchro 11 connected, in accordance with my invention, to be set on electrical zero by means of an alternating current zero-center instrument 12 having a movable coil 30 and a stationary coil 32 connected to binding terminals 1G, 2G and 1E, 2E, respectively, a high-resistance rheostat 13, a neon bulb 14, and fuse 15 to protect the instrument 12.

Figure 2:
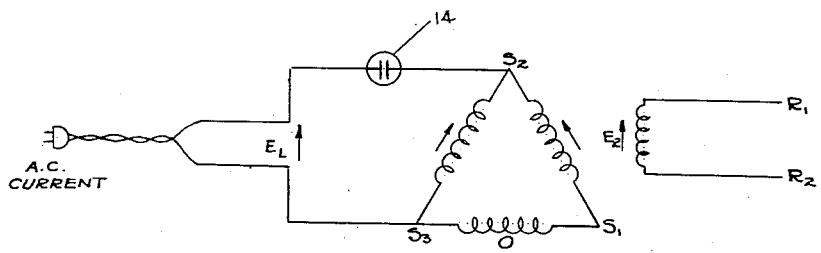
Fig. 2 represents the synchro when set on electrical zero position.

Synchro 11 may be a synchro motor, synchro generator or other self-synchronous electric machine, and consists of a rotor and a stator, the rotor having one winding $R_1$, $R_2$ on it and the stator having three windings $S_1$, $S_2$; $S_2$, $S_3$; and $S_3$, $S_1$, spaced 120 degrees apart around the rotor. When the rotor is in the electrical zero position, as shown in Fig. 2, the voltage applied to the rotor winding sets up induced voltages in the stator windings such that the voltage in winding $S_1$, $S_3$ is zero and the voltage in winding $S_2$, $S_3$ opposes the line voltage $E_L$. Since the said voltages oppose each other, the voltage across the neon bulb 14 will be less than the breakdown voltage of said bulb and said bulb remains dark.

Figure 3:
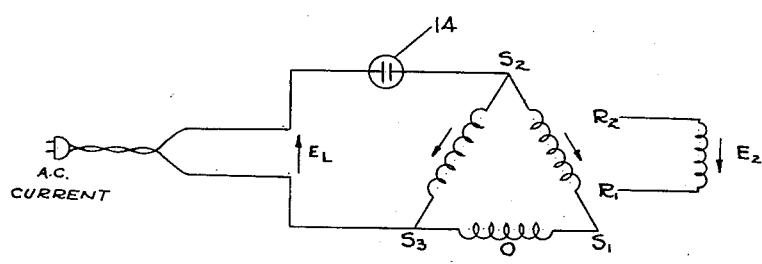
Fig. 3 represents the synchro when set on the 180° position.

When the rotor is in the 180° position as shown in Fig. 3, the voltage in winding $S_2$, $S_3$ is in the opposite direction and will add to the line voltage $E_L$. Thus, the voltage across the neon bulb 14 is greater than the breakdown voltage of said bulb and said bulb glows.

The arrows on Figs. 2 and 3, indicating the directions of the voltages, are used in accordance with a convention of alternating-current theory to indicate whether voltages add or subtract.

The induced voltage between any two of the stator terminals $S'_1$, $S'_2$, and $S'_3$, varies from a maximum in one direction through zero to a maximum in the other direction as the rotor is turned. Thus, the voltage between terminals $S_1$ and $S'_3$ will be zero at only two positions—the electrical zero and the 180° positions. Since, as shown in Fig. 1, the moving coil 30 of the instrument 12 is connected between terminals $S'_1$ and $S'_3$ the instrument 12 indicates a null at the electrical zero and the 180° positions.

In setting a synchro on electrical zero position, the rheostat 13 is set at maximum resistance so that the current through the moving coil 30 of the instrument 12 will be small at all positions of the rotor winding $R_1$, $R_2$. The rotor is then rotated until said meter indicates a null; if the neon bulb 14 is lit, the rotor is rotated through 180°. The resistance of said rheostat is then progressively decreased and more accurate adjustments of the settings are made.

Although a delta arrangement of connections for the stator windings has been indicated in the drawings, any other suitable arrangement, such as, for example, a Y arrangement, may be used if required or desired.

Modifications and changes can be made in the embodiment of this invention without departing from the spirit and scope of this invention.

The invention described herein may be manufactured and used by or for the Government of the United States of America for governmental purposes without the payment of any royalties thereon or therefor.

What is claimed is:

1. A method of setting a self-synchronous machine on electrical zero position comprising applying an alternating current excitation to the rotor of said machine insufficient to cause rotation of said rotor, positioning said rotor to yield minimum induced voltage between a pair of the stator terminals of said machine, and generating signals to indicate the electrical zero position.

2. A method of setting a self-synchronous electric machine on electrical zero position comprising applying an alternating current excitation to the rotor of said machine, utilizing the voltage induced in the windings between a selected pair of the stator terminals of said machine to provide a null indication when said rotor attains a position for which said induced voltage is a minimum, simultaneously utilizing the voltage induced in the windings between a different pair of the terminals of said machine to provide a signal indicating that said position is the electrical zero.

3. An apparatus for calibrating a self-synchronous machine having rotor and stator windings, said apparatus comprising means to apply an alternating current excitation to the rotor of said machine, said excitation being insufficient to cause rotation of said rotor, an alternating current meter connected to indicate positions of said rotor that give minimum induced voltage between a pair of the stator terminals of said machine, and means connected between a second pair of stator terminals to determine simultaneously which position is the electrical zero position.

4. Apparatus for setting a self-synchronous electric machine on electrical zero position, said machine having a stator winding provided with at least three terminals, and a rotor winding having a pair of terminals, said apparatus comprising a source of alternating current, means connecting said source to said rotor terminals, a voltage indicating means connected between first and second stator terminals and adapted to indicate the positions of said rotor that give minimum induced voltage between the selected pair of stator terminals, and further indicating means connected between said first stator terminal and a third stator terminal and adapted to indicate the sense of the induced voltage between the second pair of stator terminals.

5. The apparatus defined in claim 3, wherein said last-named means comprises a glow tube connected between said excitation-applying means and one terminal of said second pair of stator terminals.

6. The apparatus defined in claim 4, wherein said voltage indicating means comprises a zero-center instrument.

7. The apparatus defined in claim 4, wherein said further indicating means comprises a glow tube.

GEORGE ALFRED MUIR.

REFERENCES CITED

The following references are of record in the file of this patent:

UNITED STATES PATENTS

| Number | Name | Date |
|---|---|---|
| 1,554,915 | Hawlett et al. | Sept. 22, 1925 |
| 1,724,837 | Hildebrand | Aug. 13, 1929 |
| 1,755,117 | Hildebrand | Apr. 15, 1930 |
| 2,388,977 | Johnson | Nov. 13, 1945 |